US008897454B2

(12) United States Patent
Jeong et al.

(10) Patent No.: US 8,897,454 B2
(45) Date of Patent: Nov. 25, 2014

(54) SOUND ZOOMING APPARATUS AND METHOD SYNCHRONIZED WITH MOVING PICTURE ZOOMING FUNCTION

(75) Inventors: So-young Jeong, Seoul (KR); Kwang-cheol Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1159 days.

(21) Appl. No.: 12/501,260

(22) Filed: Jul. 10, 2009

(65) Prior Publication Data

US 2010/0118201 A1 May 13, 2010

(30) Foreign Application Priority Data

Nov. 13, 2008 (KR) ........................ 10-2008-0112733

(51) Int. Cl.
*H04R 5/00* (2006.01)
*H04R 3/00* (2006.01)
*H04N 5/232* (2006.01)
(52) U.S. Cl.
CPC .................................... *H04N 5/232* (2013.01)
USPC ................................ 381/26; 381/92; 381/122
(58) Field of Classification Search
USPC .............................................. 381/26, 92, 122
See application file for complete search history.

(56) References Cited

U.S. PATENT DOCUMENTS

| 4,862,278 | A | 8/1989 | Dann et al. |
| 5,477,270 | A | 12/1995 | Park |
| 6,931,138 | B2 | 8/2005 | Kawamura et al. |
| 2003/0151678 | A1 | 8/2003 | Lee et al. |
| 2005/0099511 | A1 | 5/2005 | Cazier |

FOREIGN PATENT DOCUMENTS

| JP | 6-90493 | 3/1994 |
| JP | 2000-278581 | 10/2000 |
| JP | 2004-328052 | 11/2004 |
| JP | 2006-339869 | 12/2006 |
| JP | 2007-208866 | 8/2007 |
| KR | 10-2000-0038684 | 7/2000 |

OTHER PUBLICATIONS

Korean Office Actions issued Feb. 12, 2013 in counterpart Korean Patent Application No. 10-2008-0112733 (4 pages, in Korean).

*Primary Examiner* — Duc Nguyen
*Assistant Examiner* — Kile Blair
(74) *Attorney, Agent, or Firm* — NSIP Law

(57) ABSTRACT

A sound zooming technique synchronized with a moving picture zooming function is disclosed. A signal to control ambient noise and a signal to control a long distance sound are extracted from an audio signal input through a plurality of microphones. A front directivity-emphasized signal is masked using the two signals and a weighted value to control volume.

20 Claims, 6 Drawing Sheets

SOUND ZOOMING APPARATUS AND METHOD SYNCHRONIZED WITH MOVING PICTURE ZOOMING FUNCTION

CROSS-REFERENCE TO RELATED APPLICATION(S)

This application claims the benefit under 35 U.S.C. §119(a) of a Korean Patent Application No. 10-2008-112733, filed Nov. 13, 2008, the disclosure of which is incorporated herein in its entirety by reference for all purposes.

BACKGROUND

1. Field

The following description relates to a sound zooming apparatus and method synchronized with a moving picture zooming function, and more particularly, to a sound zooming technique in which ambient noise is removed or reduced from an audio signal input through a plurality of microphones to thereby enhance a long distance sound according to moving picture zooming control.

2. Description of the Related Art

With the rapid development of apparatuses capable of taking moving pictures, such as digital camcorders or camcorder phones, user created contents (UCC) have increased in production and circulation. In addition, advances in high-speed Internet and web technologies have led to an increase in UCC distribution channels, and thus there is a greater demand for digital devices capable of photographing high-definition moving pictures.

In a conventional digital camera, since a zooming function is applied to only an image (that is, the zooming function is not applied to sounds), ambient background noise and a long distance sound are input together regardless of what is displayed on a screen of a moving picture taken in a zooming mode. Thus, it is difficult to photograph a realistic moving picture.

Thus, there is a need for an apparatus, such as a camera, camcorder, and the like, which can perform sound zooming in synchronization with zooming of a moving picture.

SUMMARY

In one general aspect, there is provided a sound zooming apparatus synchronized with a moving picture zooming function, including a first signal generator to generate a first signal to control ambient noise from an audio signal input from a plurality of microphones in synchronization with a moving picture zooming function, a second signal generator to generate a second signal to control a long distance sound from an audio signal input from a plurality of microphones in synchronization with a moving picture zooming function, and a sound zooming processor to generate a sound zooming signal according to moving picture zooming control using the first signal generated by the first signal generator, the second signal generated by the second signal generator and a third signal which is a weighted value to control volume.

The first signal generator may include a beam former to generate a front directivity-emphasized signal and a front directivity-suppressed signal from an audio signal input through a plurality of microphones, a first time-frequency transformer to transform the front directivity-emphasized signal and the front directivity-suppressed signal which are generated by the beam former into time-frequency domain signals, and a magnitude ratio transformer to receive the two signals transformed by the first time-frequency transformer and perform magnitude ratio transformation according to moving picture zooming control to generate the first signal to control ambient noise.

The magnitude ratio transformer may perform the magnitude ratio transformation based on a ratio between the two signals transformed by the first time-frequency transformer.

The magnitude ratio transformer may generate the first signal to control ambient noise by using the ratio between the two signals transformed by the first time-frequency transformer and a first value which is linearly increased or decreased according to moving picture zooming control.

The second signal generator may include a second time-frequency transformer to transform each audio signal input from a plurality of microphones into a time-frequency domain signal, and a phase difference transformer to receive the two signals transformed by the second time-frequency transformer and perform phase difference transformation according to moving picture zooming control to generate the second signal to control a long distance sound.

The phase difference transformer may perform the phase difference transformation based on a phase difference between the two signals transformed by the second time-frequency transformer.

The phase difference transformer may generate the second signal using the phase difference between the two signals transformed by the second time-frequency transformer and a second value which is linearly increased or decreased according to moving picture zooming control.

The third signal may be non-linearly increased or decreased according to moving picture zooming control.

The third signal may be non-linearly increased or decreased according to a characteristic in which sound pressure is inversely proportional to a square of a distance.

The sound zooming processor may include a first adder to add the first signal and the second signal, a first multiplier to multiply the signal generated from the first adder by the third signal, a second adder to add a reference masking constant value to the signal generated from the first multiplier, a second multiplier to multiply the signal generated from the second adder by the front directivity-emphasized signal transformed by the first time-frequency transformer, and a time-frequency synthesizer time-frequency to synthesize the signal generated from the second multiplier to generate a sound zooming signal according to moving picture zooming control.

In another general aspect, there is provided a sound zooming method synchronized with a moving picture zooming function, the method including generating a first signal to control ambient noise from an audio signal input from a plurality of microphones in synchronization with a moving picture zooming function, generating a second signal to control a long distance sound from an audio signal input from a plurality of microphones in synchronization with a moving picture zooming function, and generating a sound zooming signal according to moving picture zooming control using the first signal, the second signal and a third signal which is a weighted value to control volume.

The generating of the first signal may include generating a front directivity-emphasized signal and a front directivity-suppressed signal from an audio signal input through a plurality of microphones, transforming the front directivity-emphasized signal and the front directivity-suppressed signal into time-frequency domain signals, respectively, and receiving the transformed front directivity-emphasized and front directivity-suppressed signals and performing magnitude ratio transformation according to moving picture zooming control to generate the first signal to control ambient noise.

The magnitude ratio transformation may be performed based on a ratio between the transformed front directivity-emphasized and front directivity-suppressed signals.

The s first signal to control ambient noise may be generated by using the ratio between the transformed front directivity-emphasized and front directivity-suppressed signals and a first value which is linearly increased or decreased according to moving picture zooming control.

The generating of the second signal may include transforming each audio signal input from a plurality of microphones into a time-frequency domain signal, and receiving the transformed audio signals and performing phase difference transformation according to moving picture zooming control to generate the second signal to control a long distance sound.

The phase difference transformation may be performed based on a phase difference between the transformed audio signals.

The second signal may be generated using the phase difference between the transformed audio signals and a second value which is linearly increased or decreased according to moving picture zooming control.

The third signal may be non-linearly increased or decreased according to moving picture zooming control.

The third signal may be non-linearly increased or decreased according to a characteristic in which sound pressure is inversely proportional to a square of a distance.

The generating of the sound zooming signal may include adding the first signal and the second signal, multiplying the added signal by the third signal, adding a reference masking constant value to the multiplied signal, multiplying the signal obtained by adding the reference masking constant value to the multiplied signal by the transformed front directivity-emphasized signal, and time-frequency synthesizing the signal obtained by multiplying the signal obtained by adding the reference masking constant value to the multiplied signal by the transformed front directivity-emphasized signal to generate a sound zooming signal according to moving picture zooming control.

Other features and aspects will be apparent from the following detailed description, the drawings, and the claims.

Figure 1:
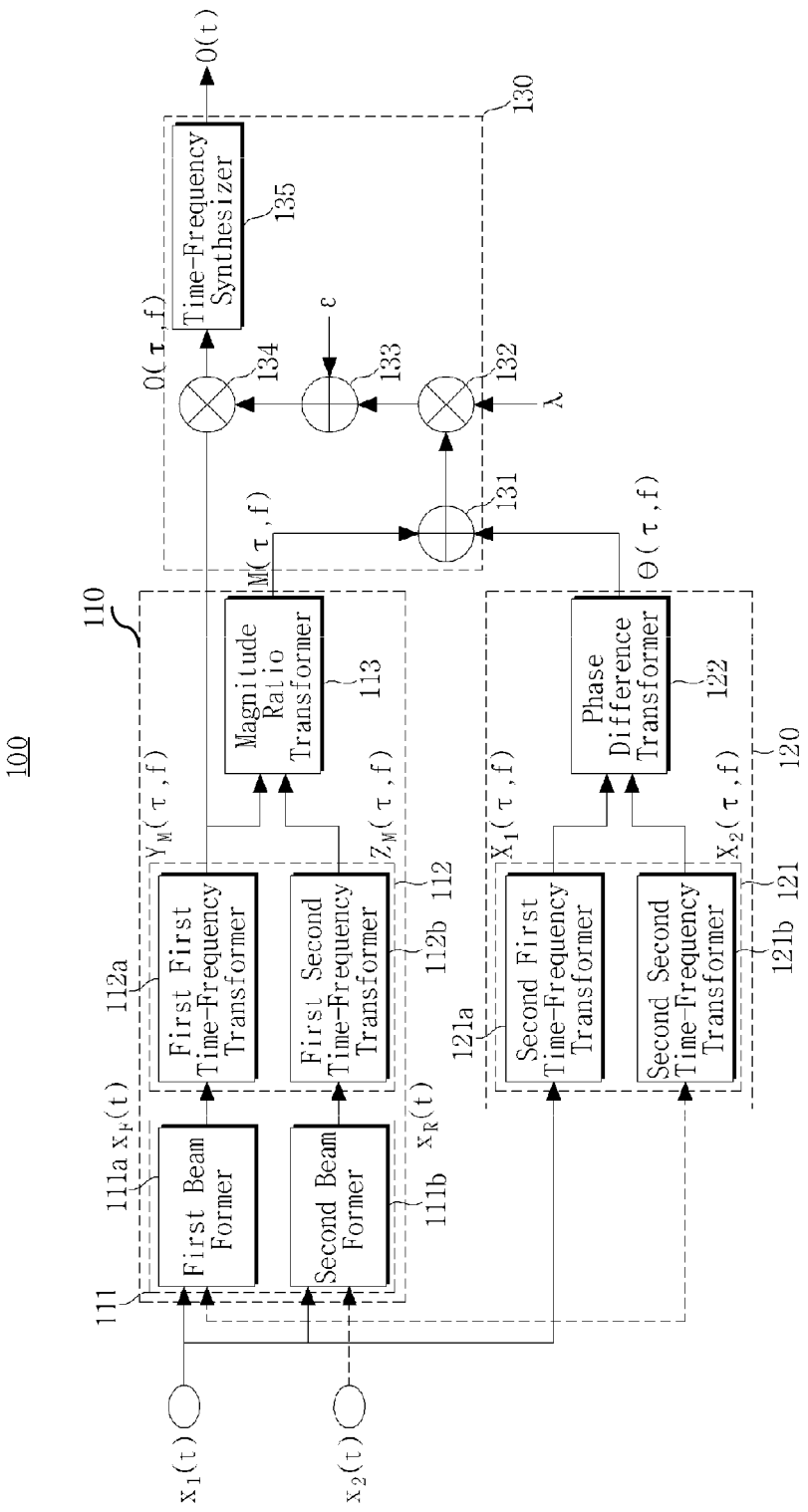
FIG. 1 is a block diagram illustrating an exemplary sound zooming apparatus synchronized with a moving picture zooming function.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

A "moving picture zooming function" refers to a function which adjusts an arrangement distance between camera lenses of a digital device to adjust a viewing angle, thereby "zooming in" (appearing to come closer to an image) on or "zooming out" (appearing to move away from an image).

A "sound zooming function" refers to a function which enhances a long distance sound through ambient noise control and long distance sound control in synchronization with a moving picture zooming function of a camera of a digital device.

A "WIDE mode" refers to a mode in which a camera lens is zoomed out to capture an ordinary image.

A "TELE mode" refers to a mode in which a camera lens is zoomed in to capture a long distance image.

In order to naturally synchronize a sound zooming function with a moving picture zooming function of a camera of a digital device, where a camera module of the digital device shifts from a WIDE mode to a TELE mode, a sound input module of the digital device may also shift from a WIDE mode to a TELE mode.

In a WIDE mode in which a short distance image is captured, an ambient background sound may be received without restriction. In contrast, in a TELE mode in which a long distance image is captured, an audio signal input into a microphone may have restricted directivity in proportion to a viewing angle of camera lenses of the digital device.

That is, in a TELE mode in which a long distance image is captured, it sound zooming control may be performed such that ambient noise is removed or reduced, and a long distance sound is enhanced.

The exemplary embodiments illustrate a sound zooming technique having a sound zooming function synchronized with a moving picture zooming function in which a weighted value to control volume depending on a distance is additionally reflected to realize a more realistic long distance sound.

FIG. 1 is a block diagram illustrating an exemplary sound zooming apparatus 100 synchronized with a moving picture zooming function. The sound zooming apparatus 100 synchronized with a moving picture zooming function includes a first signal generator 110, a second signal generator 120, and a sound zooming processor 130.

The first signal generator 110 generates a first signal to control ambient noise from an audio signal input through a plurality of microphones in synchronization with a moving picture zooming function.

The second signal generator 120 generates a second signal to control a long distance sound from an audio signal input through a plurality of microphones in synchronization with a moving picture zooming function.

The sound zooming processor 130 generates a sound zooming signal using the first signal generated by the first signal generator 110, the second signal generated by the second signal generator 120 and a third signal which is a weighted value to control volume.

Thus, if a camera module of a digital device shifts from a WIDE mode to a TELE mode, the sound zooming apparatus 100 generates the first signal to control ambient noise from the audio signal input through the plurality of microphones through the first signal generator 110. Accordingly, the first signal may remove or reduce ambient noise.

Additionally, the sound zooming apparatus 100 generates the second signal to control a long distance sound from the audio signal input through the plurality of microphones through the second signal generator 120. Accordingly, the second signal may enhance a long distance sound.

Where the first and second signals are generated through the first and second generators 110 and 120, respectively, the sound zooming apparatus 100 generates the sound zooming signal according to moving picture zooming control using the first signal, the second signal and the third signal, which is a weighted value to control volume, through the sound zooming processor 130.

The sound zooming signal is a signal in which ambient noise is removed or reduced, a long distance sound is enhanced and a weighted value to control volume according to a distance is considered, and naturally synchronizes a sound zooming function with a moving picture zooming function of a camera of the digital device. Accordingly, a more realistic moving picture can be obtained.

The first signal generator 110 may include a beam former 111, a first time-frequency transformer 112, and a magnitude ratio transformer 113.

The beam former 111 generates a signal in which front directivity is emphasized and a signal in which front directivity is suppressed, from an audio signal input through a plurality of microphones.

The beam former 111 may include a first beam former lila to generate the front directivity-emphasized signal from an audio signal input through a plurality of microphones and a second beam former 111b to generate the front directivity-suppressed signal from an audio signal input through a plurality of microphones.

For example, the front directivity-emphasized signal may be obtained by addition of audio signals input from the plurality of microphones, and the front directivity-suppressed signal can be obtained by subtraction of audio signals input from the plurality of microphones.

Referring to FIG. 1, where two audio signals $x_1(t)$ and $x_2(t)$ are input from two microphones, the first beam former lila adds the two audio signals $x_1(t)$ and $x_2(t)$ and divides the sum by 2 to generate a front directivity-emphasized signal $x_F(t)$ $(=\{x_1(t)+x_2(t)\}/2)$.

The second beam former 111b subtracts the two audio signals $x_1(t)$ and $x_2(t)$ to generate a front directivity-suppressed signal $x_R(t)(=x_1(t)-x_2(t))$.

The first time-frequency transformer 112 transforms the front directivity-emphasized signal and the front directivity-suppressed signal which are generated by the beam former 111 into time-frequency domain signals, respectively. That is, the first time-frequency transformer 112 divides the front directivity-emphasized signal and the front directivity-suppressed signal, which are time domain signals generated by the beam former 111, into frame sections and transforms the frame sections into time-frequency domain signals, respectively, using a frequency transformation such as a fast Fourier transformation (FFT).

The first time-frequency transformer 112 may include a first first time-frequency transformer 112a to transform the front directivity-emphasized signal generated by the first beam former 111a into a time-frequency domain signal and a first second time-frequency transformer 112b which transforms the front directivity-suppressed signal generated by the second beam former 111b into a time-frequency domain signal.

Referring to FIG. 1, $x_F(t)$ which is a time domain signal in which front directivity is emphasized is divided into frame sections by the first first time-frequency transformer 112a and is frequency-transformed into $Y_M(\tau,f)$ which is a time-frequency domain signal by a FFT.

$x_R(t)$ which is a time domain signal in which front directivity is suppressed is divided into frame sections by the first second time-frequency transformer 112b and is frequency-transformed into $Z_M(\tau,f)$ which is a time-frequency domain signal by a FFT. Here, $\tau$ denotes a unit of a frame, and f denotes a unit of frequency.

The magnitude ratio transformer 113 receives the two signals transformed by the first time-frequency transformer 112 and performs magnitude ratio transformation according to moving picture zooming control to generate the first signal to control ambient noise. The magnitude ratio transformer 113 may perform magnitude ratio transformation based on a ratio between the two signals transformed by the first time-frequency transformer 112.

For example, the magnitude ratio transformer 113 may be configured to generate the first signal to control ambient noise using a ratio between two signals transformed by the first time-frequency transformer 112 and a first value which is linearly increased and/or decreased according to moving picture zooming control.

A relative magnitude $M(\tau,f)(=|Y_M(\tau,f)|/(|Z_M(\tau,f)|+\epsilon))$ of a time-frequency domain of the two signals $Y_M(\tau,f)$ and $Z_M(\tau,f)$ transformed by the first time-frequency transformer 112 represents a local signal-to-noise ratio (SNR). Here, $\epsilon$ is a very small constant and serves to prevent a denominator from becoming zero (0).

A SNR commonly refers to a ratio of noise to ambient background sound. The magnitude ratio transformer 113 generates the first signal to control ambient noise using a non-linear function having a magnitude between 0 and 1 so that the SNR may be enhanced where a value of $M(\tau,f)$ is equal to or more than a predetermined value and may be suppressed where a value of $M(\tau,f)$ is less than a predetermined value.

If the non-linear function is $f(x,\alpha 1,\alpha 2)=1/\{1+\exp(-\alpha 1 \cdot (x-\alpha 2))\}$ and the first signal generated for controlling ambient noise is $M'(\tau,f)=f(M(\tau,f),\alpha 1,\alpha 2)$, an audio signal is recognized as a dominant sound and thus enhanced where a value of $M'(\tau,f)$ is close to 1 and is recognized as a non-dominant sound, i.e., a noise, and thus suppressed where a value of $M'(\tau,f)$ is close to 0.

Figure 2:
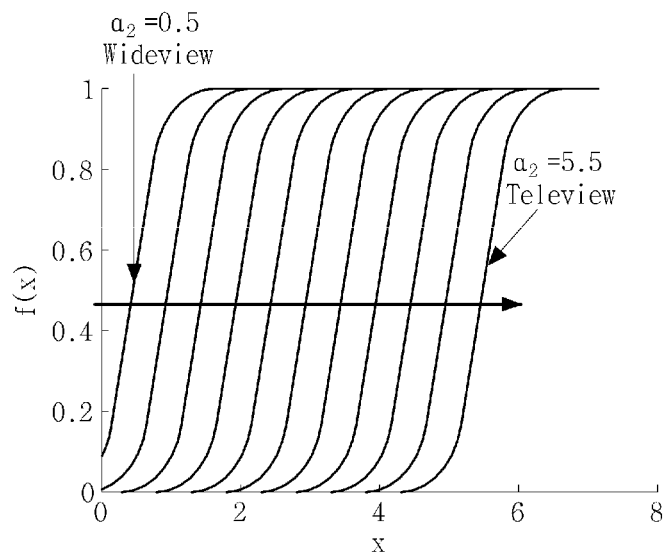
FIG. 2 illustrates an exemplary non-linear function graph according to a variation of a parameter to control ambient noise in synchronization with a moving picture zooming function.

In the above formula, a slope $\alpha 1$ has a smaller value as $|Y_M(\tau,f)|$ becomes larger than $|Z_M(\tau,f)|$, that is, as ambient noise is reduced, and $\alpha 2$ is a parameter value synchronized with a moving picture zooming function, that is, a first value which is linearly increased or decreased according to moving picture zooming control. $\alpha 2$ is linearly increased or decreased to have a small value in a WIDE mode and a large value in a TELE mode. FIG. 2 illustrates an exemplary non-linear function graph according to a variation of the parameter $\alpha 2$ to control ambient noise in synchronization with a moving picture zooming function.

A value of $\alpha 2$ may be adjusted to offset ambient noise slightly in a WIDE mode and greatly in a TELE mode, so that the sound zooming operation is performed in synchronization with the moving picture zooming operation to remove ambient noise.

The second signal generator 120 may include a second time-frequency transformer 121 and a phase difference transformer 122.

The second time-frequency transformer 121 transforms each of audio signals input from a plurality of microphones into a time-frequency domain signal.

The second time-frequency transformer 121 divides each of the audio signals input from the plurality of microphones into frame sections and transforms each frame section into a time-frequency domain signal using a frequency transformation such as a FFT.

For example, the second time-frequency transformer 121 may include a second-first time-frequency transformer 121a which transforms an audio signal input from one microphone into a time-frequency domain signal and a second-second time-frequency transformer 121b which transforms an audio signal input from another microphone into a time-frequency domain signal.

Referring to FIG. 1, two audio signals $x_1(t)$ and $x_2(t)$ may be divided into frame sections by the second-first time-frequency transformer 121a and the second-second time-frequency transformer 121b, respectively, and may be transformed into time-frequency domain (spectrogram) signals $X_1(\tau,f)$ and $X_2(\tau,f)$, respectively, using a frequency transformation such as a FFT. Here, $\tau$ denotes a unit of a frame, and f denotes a unit of frequency.

The phase difference transformer 122 receives the two signals transformed by the second time-frequency transformer 121 and performs phase difference transformation according to moving picture zooming control to generate the second signal to control a long distance sound. The phase difference transformer 122 may perform phase difference transformation based on a phase difference between two signals transformed by the second time-frequency transformer 121.

For example, the phase difference transformer 122 may be configured to generate the second signal using a phase difference between the two signals transformed by the second time-frequency transformer 121 and a second value which is linearly increased or decreased according to moving picture zooming control.

A phase difference between two signals $X_1(\tau,f)$ and $X_2(\tau,f)$ transformed by the second time-frequency transformer 121 is $\theta(\tau,f)=|\angle X_1(\tau,f)-\angle X_2(\tau,f)|$. As a phase difference becomes smaller, a signal input through a microphone has a larger front directional signal component, and as a phase difference becomes larger, a signal input through a microphone has a larger omni-directional signal component.

The phase difference transformer 122 generates the second signal to control a long distance sound using a non-linear function so that a phase difference signal $\theta(\tau,f)$ may have a magnitude between 0 and 1.

If the non-linear function is $g(x,\beta1,\beta2)=1/\{1+\exp(\beta1\cdot(x-\beta2))\}$ and the second signal generated to control a long distance sound is $\theta'(\tau,f)=g(M(\tau,f),\beta1,\beta2)$, where $\theta'(\tau,f)$ is close to 0, it is recognized as a WIDE mode, and ambient sound is enhanced, whereas where $\theta'(\tau,f)$ is close to 1, it is recognized as a TELE mode, and a long distance sound is enhanced.

Figure 3:
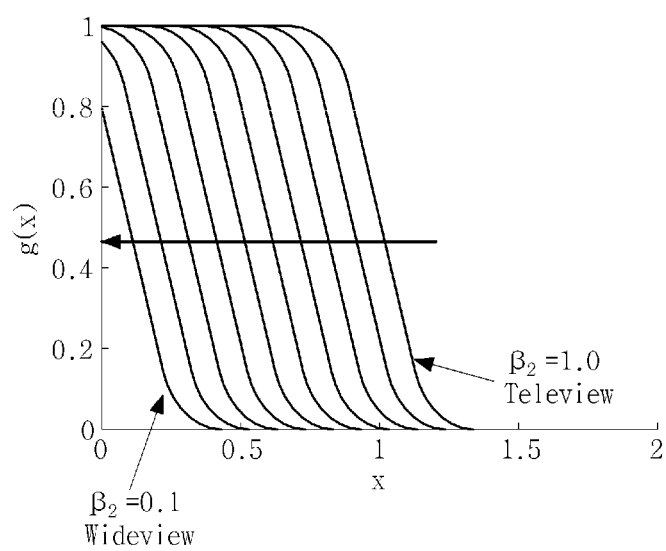
FIG. 3 illustrates an exemplary non-linear function graph according to a variation of a parameter to control a long distance sound in synchronization with a moving picture zooming function.

In the above formula, a slope $\beta1$ may be a random constant value, and $\beta2$ may be a parameter value which is synchronized with a moving picture zooming function, that is, a second value which is linearly increased or decreased according to moving picture zooming control. $\beta2$ may be linearly increased or decreased to have a large value in a WIDE mode and a small value in a TELE mode. FIG. 3 illustrates an exemplary non-linear function graph according to a variation of the parameter $\beta2$ which is synchronized with a moving picture zooming function.

A value of $\beta2$ may be adjusted to enhance ambient noise in a WIDE mode and to enhance a long distance sound in a TELE mode, so that a sound zooming operation is performed in synchronization with a moving picture zooming operation to enhance a long distance sound.

The sound zooming processor 130 may include a first adder 131, a first multiplier 132, a second adder 133, a second multiplier 134, and a time-frequency synthesizer 135.

The sound zooming processor 130 may obtain a sound zooming signal which is synchronized with a moving picture zooming function using a masking effect in which hearing ability is reduced by synthesizing one sound with another sound, and may generate a masking signal which is to be synthesized with the front directivity-emphasized signal.

The first adder 131 adds the first signal and the second signal. That is, the first adder 131 sets a masking filter function by adding the first signal $M'(\tau,f)$ to control ambient noise which is output from the first signal generator 110 and the second signal $\theta'(\tau,f)$ to control a long distance sound which is output from the second signal generator 120. That is, "$M'(\tau,f)+\theta'(\tau,f)$" is a masking filter function set by the first adder 131.

The first multiplier 132 multiplies a signal output from the first adder 131 by the third signal. The third signal is a parameter which is non-linearly increased or decreased according to moving picture zooming control and is a weighted value to control volume. For example, the third signal can be defined as $\lambda(x)=x^2$ to be non-linearly increased or decreased according to a characteristic in which sound pressure is inversely proportional to a square of a distance. Therefore, "$\lambda\cdot(M'(\tau,f)+\theta'(\tau,f))$" is obtained as a value multiplied by the first multiplier 132.

The second adder 133 adds a reference masking constant value to the signal output from the first multiplier 132. If the reference masking constant value is $\epsilon$, a value obtained by the second adder 133 is "$\epsilon+\lambda\cdot(M'(\tau,f)+\theta'(\tau,f))$". This value may be used as the masking signal to be synthesized with the front directivity-emphasized signal.

The second multiplier 134 multiplies the signal output from the second adder 133 by the front directivity-emphasized signal output from the first time-frequency transformer 112. That is, a sound zooming signal according to moving picture zooming control is generated using the masking effect by multiplying the front directivity-emphasized signal $Y_M(\tau,f)$ output from the first time-frequency transformer 112 by the masking signal generated by the second adder 133 through the second multiplier 134.

If the signal generated by the second multiplier 134 is $O(\tau,f)$, $O(\tau,f)=\{\epsilon+\lambda\cdot(M'(\tau,f)+\theta'(\tau,f))\}\cdot Y_M(\tau,f)$ is derived as a sound zooming signal. In a WIDE mode, $\lambda=0$ and $O(\tau,f)=\epsilon\cdot Y_M(\tau,f)$, and thus the function to remove or reduce ambient noise and enhance a long distance sound is not performed, but in a TELE mode, $\lambda=1$, and $O(\tau,f)=\{\epsilon+M'(\tau,f)+\theta'(\tau,f)\}\cdot Y_M(\tau,f)$, and thus ambient noise is removed or reduced, and a long distance sound is enhanced.

Therefore, the third signal $\lambda$ is non-linearly increased or decreased according to moving picture zooming control and used as the weighted value to control volume, so that a sound zooming signal in which ambient noise control, long distance sound control and a weighted value to control volume are reflected is obtained in synchronization with a moving picture zooming function.

The time-frequency synthesizer 135 time-frequency synthesizes a signal output from the second multiplier 134 to generate a sound zooming signal according moving picture zooming control. Since a signal O(τ,f) output from the second multiplier 134 is a time-frequency domain signal, the time-frequency synthesizer 135 time-frequency synthesizes a signal O(τ,f) to generate a signal O(t) which is a time domain signal according to moving picture zooming control.

As described above, the sound zooming processor 130 obtains a sound zooming control signal which is synthesized with a moving picture zooming function using a masking effect and synthesizes a sound zooming control signal with a front directivity-emphasized signal to thereby obtain a zoomed sound in which signal processing to control ambient noise, signal processing to control a long distance sound and a weighted value to control volume are reflected and is naturally synchronized with moving picture zooming of, for example, a camera of a digital device. Accordingly, a more realistic moving picture may be provided.

Figure 4:
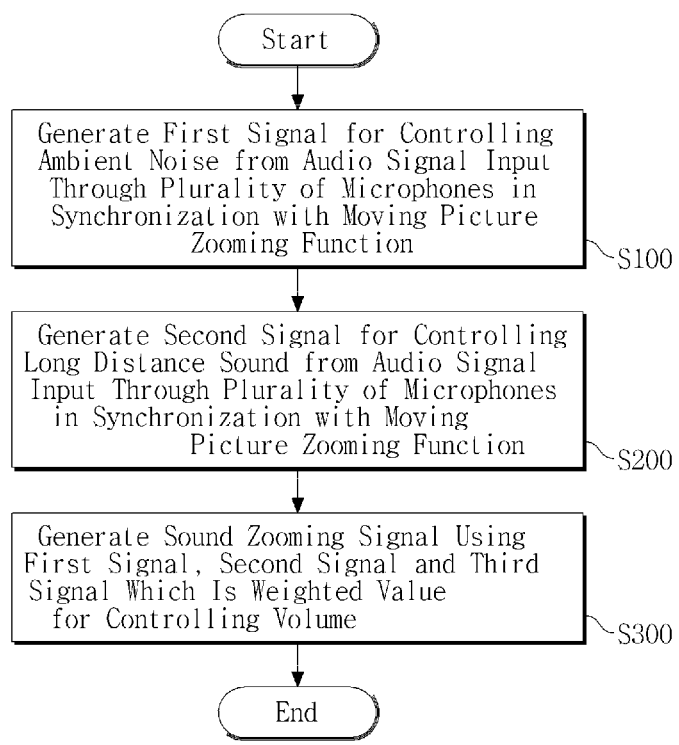
FIG. 4 is a flowchart illustrating an exemplary sound zooming method synchronized with a moving picture zooming function.

A sound zooming control operation of a sound zooming apparatus synchronized with an exemplary moving picture zooming function will be described with reference to FIGS. 4 through 7. FIG. 4 is a flowchart illustrating an exemplary sound zooming method synchronized with a moving picture zooming function.

As illustrated in FIG. 4, in a first signal generating operation S100, a sound zooming apparatus synchronized with a moving picture zooming function generates a first signal to control ambient noise from an audio signal input through a plurality of microphones in synchronization with a moving picture zooming function.

In a second signal generating operation S200, the sound zooming apparatus synchronized with the moving picture zooming function generates a second signal to control a long distance sound from an audio signal input through a plurality of microphones in synchronization with the moving picture zooming function.

In a sound zooming processing operation S300, the sound zooming apparatus synchronized with the moving picture zooming function generates a sound zooming signal according to moving picture zooming control using the first signal generated in the first signal generating operation S100, the second signal generated in the second signal generating operation S200 and a third signal which is a weighted value to control volume.

If, for example, a camera module of a digital device shifts from a WIDE mode to a TELE mode, the sound zooming apparatus synchronized with the moving picture zooming function may generate the first signal to control ambient noise from the audio signal input through the plurality of microphones, generate the second signal to control a long distance sound from the audio signal input through the plurality of microphones, and generate the sound zooming signal according to moving picture zooming control by masking the front directivity-emphasized signal using the first signal, the second signal, and the third signal which is the weighted value to control volume.

The sound zooming signal, that is, ambient noise is removed or reduced, a long distance sound is enhanced, and a weighted value to control volume according to a distance is considered. Thus, the sound zooming function may be naturally synchronized with a moving picture zooming function of, for example, a camera of a digital device using the sound zooming signal, and a more realistic moving picture may be obtained.

Figure 5:
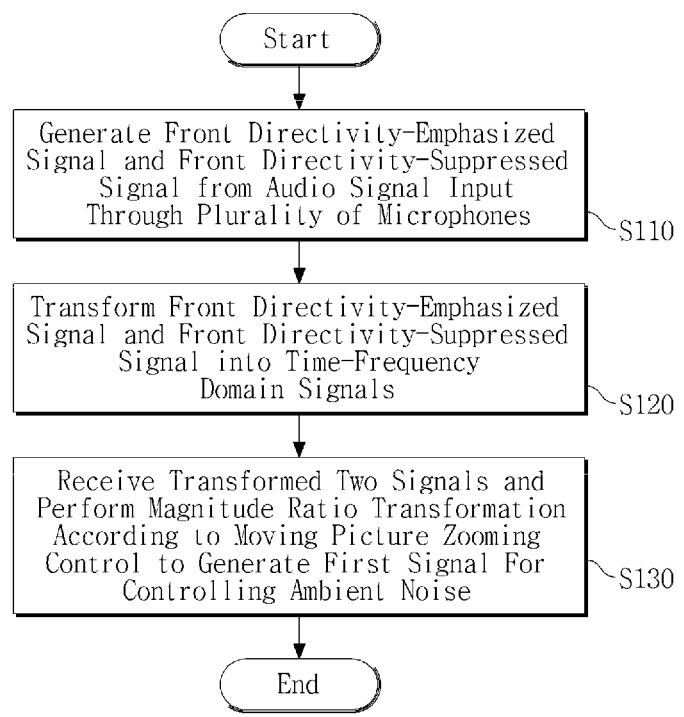
FIG. 5 is a flowchart illustrating an exemplary signal processing operation of controlling ambient noise.

FIG. 5 is a flowchart illustrating an exemplary signal processing operation to control ambient noise. As illustrated in FIG. 5, a first signal generating operation S100 in which a first signal to control ambient noise is generated from an audio signal input through a plurality of microphones in synchronization with a moving picture zooming function, includes a beam forming operation S110, a first time-frequency transforming operation S120, and a magnitude ratio transforming operation S130.

In order to generate the first signal to control ambient noise, in the beam forming operation S110, the sound zooming apparatus synchronized with the moving picture zooming function generates a front directivity-emphasized signal and a front directivity-suppressed signal from an audio signal input through a plurality of microphones. A method of generating a front directivity-emphasized signal and a front directivity-suppressed signal is described above, and thus a description thereof will not be repeated for conciseness.

In the first time-frequency transforming operation S120, the sound zooming apparatus synchronized with the moving picture zooming function transforms the front directivity-emphasized signal and the front directivity-suppressed signal, which are generated in the beam forming operation S110, into time-frequency domain signals, respectively. The method of transforming the front directivity-emphasized signal and the front directivity-suppressed signal is described above, and thus a description thereof will not be repeated for conciseness.

In the magnitude ratio transforming operation S130, the sound zooming apparatus synchronized with the moving picture zooming function receives the two signals transformed in the first time-frequency transforming operation S120 and performs magnitude ratio transformation according to moving picture zooming control to thereby generate the first signal to control ambient noise.

In the magnitude ratio transforming operation S130, the magnitude ratio transformation may be performed based on a ratio between the two signals transformed in the first time-frequency transforming operation S120. For example, in the magnitude ratio transforming operation S130, the first signal to control ambient noise may be generated using the ratio between the two signals transformed in the first time-frequency transforming operation S120 and a first value which is linearly increased or decreased according to moving picture zooming control.

The method of performing the magnitude ratio transformation according to moving picture zooming control to generate the first signal to control ambient noise is described above, and thus a description thereof will not be repeated for conciseness.

As described above, in the first signal generating operation S100, a first signal to control ambient noise may be generated from the audio signal input through the plurality of microphones.

Figure 6:
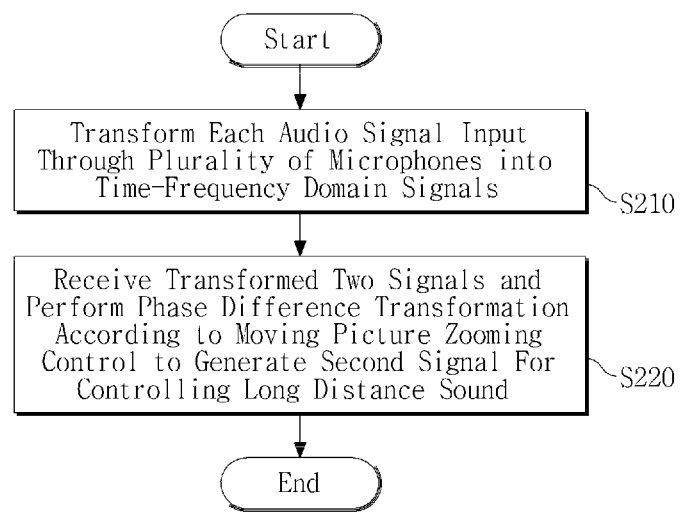
FIG. 6 is a flowchart illustrating an exemplary signal processing operation of controlling a long distance sound.

FIG. 6 is a flowchart illustrating an exemplary signal processing operation of controlling a long distance sound. As illustrated in FIG. 6, a second signal generating operation S200 in which a second signal to control a long distance sound is generated from an audio signal input through a plurality of microphones in synchronization with a moving picture zooming function, includes a second time-frequency transforming operation S210 and a phase difference transforming operation S220.

In order to generate the second signal to control a long distance sound, in the second time-frequency transforming operation S210, the sound zooming apparatus synchronized with the moving picture zooming function transforms each audio signal input from the plurality of microphones into a time-frequency domain signal. The method of transforming each audio signal input from the plurality of microphones into the time-frequency domain signal is described above, and thus a description thereof will not be repeated for conciseness.

In the phase difference transforming operation S220, the sound zooming apparatus synchronized with the moving picture zooming function receives the two signals transformed in the second time-frequency transforming operation S210 and performs phase difference transformation according to moving picture zooming control to thereby generate the second signal to control a long distance sound.

At this time, in the phase difference transforming operation S220, the phase difference transformation may be performed based on a phase difference between the two signals transformed in the second time-frequency transforming operation S210. For example, in the phase difference transforming operation S220, the second signal may be generated using the phase difference between the two signals transformed in the second time-frequency transforming operation S210 and a second value which is linearly increased and/or decreased according to moving picture zooming control.

The method of performing the phase difference transformation according to moving picture zooming control to generate the second signal to control a long distance sound is described above, and thus a description thereof will not be repeated for conciseness.

As described above, in the second signal generating operation S200, the second signal for controlling a long distance sound can be generated from the audio signal input through the plurality of microphones.

Figure 7:
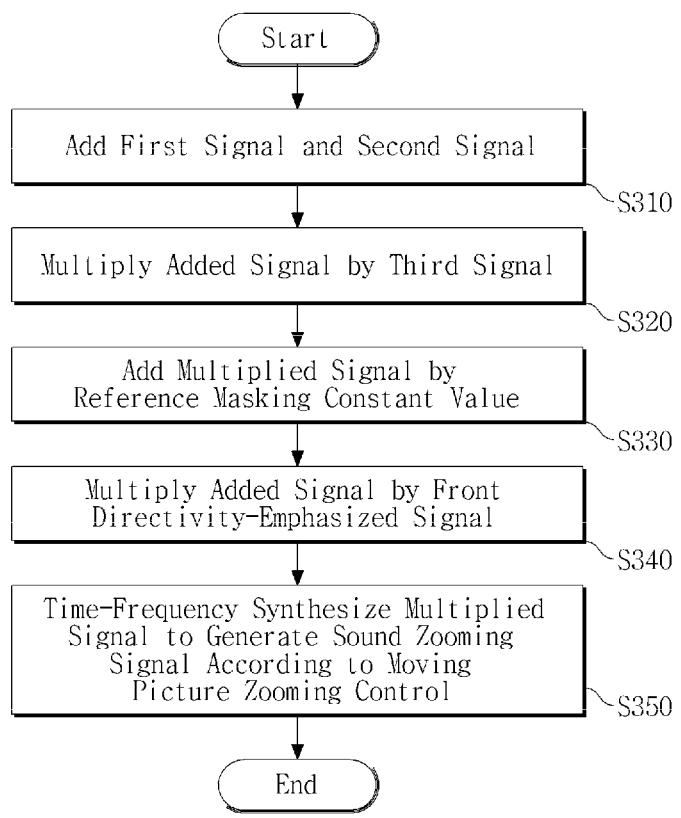
FIG. 7 is a flowchart illustrating an exemplary operation of generating a sound zooming signal according to moving picture zooming control using a weighted value to control volume.

FIG. 7 is a flowchart illustrating an exemplary operation of generating a sound zooming signal according to moving picture zooming control using a weighted value to control volume. As illustrated in FIG. 7, a sound zooming processing operation S300 of generating a sound zooming signal according to moving picture zooming control using a weighted value to control volume includes a first adding operation S310, a first multiplying operation S320, a second adding operation S330, a second multiplying operation S340, and a time-frequency synthesizing operation S350.

In order to generate the sound zooming signal according to moving picture zooming control using the weighted value to control volume, in the first adding operation S310, the sound zooming apparatus synchronized with the moving picture zooming function adds the first signal generated in the first signal generating operation S100 and the second signal generated in the second signal generating operation S200. The method of adding the first signal and the second signal is described above, and thus a description thereof will not be repeated for conciseness.

In the first multiplying operation S320, the sound zooming apparatus synchronized with the moving picture zooming function multiplies the signal added in the first adding operation S310 by a third signal which is the weighted value to control volume. At this time, the third signal may be non-linearly increased or decreased according to moving picture zooming control. For example, the third signal can be non-linearly increased and/or decreased according to a characteristic in which sound pressure is inversely proportional to a square of a distance. The method of multiplying the signal obtained by adding the first signal and the second signal by the third signal is described above, and thus a description thereof will not be repeated for conciseness.

In the second adding operation S330, the sound zooming apparatus synchronized with the moving picture zooming function adds a reference masking constant value to the signal multiplied in first multiplying operation S320. The method of adding the reference masking constant value is described above, and thus a description thereof will not be repeated for conciseness.

In the second multiplying operation S340, the sound zooming apparatus synchronized with the moving picture zooming function multiplies the signal added in the second adding operation S330 by the front directivity-emphasized signal transformed in the first time-frequency transforming operation S120. The method of multiplying the added signal by the front directivity-emphasized signal is described above, and thus a description thereof will not be repeated for conciseness.

In the time-frequency synthesizing operation S350, the sound zooming apparatus synchronized with the moving picture zooming function time-frequency synthesizes the signal multiplied in the second multiplying operation S340 to generate a sound zooming signal according to moving picture zooming control. The method of time-frequency synthesizing the multiplied time-frequency domain signal to generate the sound zooming signal, which is a time domain signal, according to moving picture zooming control is described above, and thus a description thereof will not be repeated for conciseness.

As described above, in the sound zooming processing operation S300, the sound zoom control signal according to moving picture zooming control is generated using the weighted value to control volume, and the sound zoom control signal is synthesized with the front directivity-emphasized signal using a masking effect. Accordingly, the sound zooming signal in which signal processing to control ambient noise, signal processing to control a long distance sound and the weighted value to control volume are reflected and is synchronized with a moving picture zooming function of, for example, a camera of a digital device can be obtained.

Accordingly, a zoomed sound which is naturally synchronized with moving picture zooming of, for example, a camera of a digital device may be obtained, and a more realistic moving picture may also be obtained.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

The above description relates to a sound zooming control technique in which a sound synchronized with moving picture zooming of, for example, a camera of a digital device is generated by masking a front directivity-emphasized signal using a signal to control ambient noise, a signal to control a long distance sound and a signal in which a weighted value to control volume is reflected.

An exemplary sound zooming apparatus synchronized with the moving picture zooming function may generate a sound zooming signal using a signal to control ambient noise and a signal to control a long distance sound which are generated from an audio signal input through a plurality of microphones, and a weighted value to control volume.

A moving picture zooming function of, for example, a camera of a digital device may be naturally synchronized with a sound zooming function, and thus a more realistic moving picture may be obtained.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A sound zooming apparatus that is synchronized with a moving picture zooming function, the sound zooming apparatus comprising:
    a first signal generator that generates a first signal for controlling ambient noise from audio signals input from a plurality of microphones, the first signal is generated by transforming a front-directivity emphasized signal, which is obtained by addition of the audio signals input from the plurality of microphones, and a front-directivity suppressed signal, which is obtained by subtraction of the audio signals input from the plurality of microphones, into time-frequency domain signals, and performing magnitude ratio transformation on each of the time-frequency domain signals according to moving picture zooming control;
    a second signal generator that generates a second signal for controlling a long distance sound from the audio signals input from the plurality of microphones, the second signal is generated by transforming the audio signals into time-frequency domain signals, and performing phase difference transformation on each of the time-frequency domain signals according to the moving picture zooming control; and
    a sound zooming processor that generates a sound zooming signal based upon the moving picture zooming control, the first signal, the second signal, and a third signal, which is a weighted value, wherein
    the sound zooming signal controls the volume of the first and second signal components.

2. The sound zooming apparatus of claim 1, wherein the first signal generator comprises:
    a beam former configured to generate the front-directivity emphasized signal and the front-directivity suppressed signal from the audio signals;
    a first transformer configured to transform the front-directivity emphasized signal and the front-directivity suppressed signal into first and second time-frequency domain signals, respectively; and
    a magnitude ratio transformer configured to perform a magnitude ratio transformation on the first and second time-frequency domain signals, based on the moving picture zooming control, so as to generate the first signal, wherein:
    the beam former generates the front-directivity emphasized signal by amplifying audio signals received from a frontal direction of the microphones, and
    the beam former generates the front-directivity suppressed signal by attenuating audio signals received from the frontal direction of the microphones.

3. The sound zooming apparatus of claim 2, wherein the magnitude ratio transformer performs the magnitude ratio transformation based on a ratio between the first and second time-frequency domain signals.

4. The sound zooming apparatus of claim 3, wherein the magnitude ratio transformer generates the first signal based on the ratio between the first and second time-frequency domain signals and a first value, which is linearly increased or decreased according to the moving picture zooming control.

5. The sound zooming apparatus of claim 1, wherein the second signal generator comprises:
    a first transformer configured to transform each audio signal received from the microphones into a time-frequency domain signal; and
    a phase difference transformer configured to receive the signals transformed by the first transformer and perform the phase difference transformation on the received signals, according to the moving picture zooming control, so as to generate the second signal.

6. The sound zooming apparatus of claim 5, wherein the phase difference transformer performs the phase difference transformation based on the phase difference between the received signals.

7. The sound zooming apparatus of claim 5, wherein the phase difference transformer generates the second signal based upon the phase difference between the received signals and a first value, which is linearly increased or decreased according to the moving picture zooming control.

8. The sound zooming apparatus of claim 1, wherein the third signal is non-linearly increased or decreased according to the moving picture zooming control.

9. The sound zooming apparatus of claim 8, wherein the third signal is non-linearly increased or decreased according to a characteristic in which sound pressure is inversely proportional to distance squared.

10. The sound zooming apparatus of claim 2, wherein the sound zooming processor comprises:
    a first adder configured to add the first signal and the second signal so as to generate a fourth signal;
    a second multiplier configured to multiply the fourth signal by the third signal so as to generate a fifth signal;
    a second adder configured to add a reference masking constant value to the fifth signal so as to generate a sixth signal;
    a third multiplier configured to multiply the sixth signal by the front-directivity emphasized signal so as to generate a seventh signal; and
    a frequency synthesizer configured to synthesize the seventh signal so as to generate the sound zooming signal.

11. A sound zooming method synchronized with a moving picture zooming function, the method comprising:
    generating a first signal for controlling ambient noise from audio signals input from a plurality of microphones, the first signal is generated by transforming a front-directivity emphasized signal, which is obtained by addition of the audio signals input from the plurality of microphones, and a front-directivity suppressed signal, which is obtained by subtraction of the audio signals input from the plurality of microphones, into time-frequency domain signals, and performing magnitude ratio transformation on each of the time-frequency domain signals according to moving picture zooming control;

generating a second signal for controlling a long distance sound from the audio signals input from the plurality of microphones, the second signal is generated by transforming the audio signals into time-frequency domain signals, and performing phase difference transformation on each of the time-frequency domain signals according to the moving picture zooming control; and generating a sound zooming signal based upon the moving picture zooming control, the first signal, the second signal, and a third signal, which is a weighted value, wherein the sound zooming signal controls the volume of the first and second signal components.

12. The sound zooming method of claim 11, wherein the operation of generating the first signal comprises:

transforming the front-directivity emphasized signal and the front-directivity suppressed signal into first and second time-frequency domain signals, respectively; and performing the magnitude ratio transformation on the first and second time-frequency domain signals, based on the moving picture zooming control, to generate the first signal, wherein:

the front-directivity emphasized signal is generated by amplifying audio signals received from a frontal direction of the microphones, and the front-directivity suppressed signal is generated by attenuating audio signals received from the frontal direction of the microphones.

13. The sound zooming method of claim 12, wherein the magnitude ratio transformation is based on a ratio between the first and second time-frequency domain signals.

14. The sound zooming method of claim 13, wherein the magnitude ratio transformation generates the first signal based on the ratio between the first and second time-frequency domain signals and a first value, which is linearly increased or decreased according to the moving picture zooming control.

15. The sound zooming method of claim 11, wherein the operation of generating the second signal comprises:

transforming each audio signal received from the microphones into a time-frequency domain signal; and performing the phase difference transformation on the time-frequency domain signals, according to the moving picture zooming control, to generate the second signal.

16. The sound zooming method of claim 15, wherein the phase difference transformation is based on the phase difference between the time-frequency domain signals.

17. The sound zooming method of claim 15, wherein the phase difference transformation generates the second signal based upon the phase difference between the time-frequency domain signals and a first value, which is linearly increased or decreased according to the moving picture zooming control.

18. The sound zooming method of claim 11, wherein the third signal is non-linearly increased or decreased according to the moving picture zooming control.

19. The sound zooming method of claim 18, wherein the third signal is non-linearly increased or decreased according to a characteristic in which sound pressure is inversely proportional to distance squared.

20. The sound zooming method of claim 12, wherein the operation of generating the sound zooming signal comprises:

adding the first signal and the second signal to generate a fourth signal;

multiplying the fourth signal by the third signal to generate a fifth signal;

adding a reference masking constant value to the fifth signal to generate a sixth signal;

multiplying the sixth signal by the front-directivity emphasized signal to generate a seventh signal; and synthesizing the seventh signal to generate the sound zooming signal.

\* \* \* \* \*